United States Patent [19]

Grohoski et al.

[11] Patent Number: 5,075,840
[45] Date of Patent: Dec. 24, 1991

[54] TIGHTLY COUPLED MULTIPROCESSOR INSTRUCTION SYNCHRONIZATION

[75] Inventors: Gregory F. Grohoski, Cedar Park; James A. Kahle; Myhong Nguyenphu, both of Austin; David S. Ray, Leander, all of Tex.

[73] Assignee: International Business Machines Corporation, Armonk, N.Y.

[21] Appl. No.: 297,783

[22] Filed: Jan. 13, 1989

[51] Int. Cl.$^5$ .............................................. G06F 1/00
[52] U.S. Cl. ................................. 395/800; 364/200; 364/DIG. 1
[58] Field of Search ... 364/200 MS File, 900 MS File

[56] References Cited

U.S. PATENT DOCUMENTS

| | | | |
|---|---|---|---|
| 3,896,418 | 6/1975 | Brown | 364/200 |
| 3,921,149 | 11/1975 | Kreis et al. | 364/200 |
| 4,564,901 | 1/1986 | Tomlinson et al. | 364/200 |
| 4,590,555 | 5/1986 | Bourrez | 364/200 |
| 4,937,741 | 6/1990 | Harper et al. | 364/200 |

FOREIGN PATENT DOCUMENTS

| | | |
|---|---|---|
| 0231526 | 8/1987 | European Pat. Off. . |
| 0312764 | 4/1989 | European Pat. Off. . |
| 0993535 | 5/1965 | United Kingdom . |
| 1441458 | 6/1976 | United Kingdom . |

OTHER PUBLICATIONS

*IBM Technical Disclosure Bulletin*, vol. 25, No. 3B, Aug. 1982, pp. 1637–1638, entitled "Multiprocessor Synchronization Decision Method".
*IBM Technical Disclosure Bulletin*, vol. 30, No. 7, Dec. 1987, pp. 98–99, entitled "Synchronization Processing Elements for Highly Parallel Multiprocessor Systems".
*IBM Technical Disclosure Bulletin*, vol. 29, No. 10, Mar. 1987, pp. 4658–4687, entitled "Run-Time Algorithms for Distributed Processing Synchronization and Address Calculations".

*Primary Examiner*—Douglas W. Olms
*Assistant Examiner*—T. Samuel
*Attorney, Agent, or Firm*—Thomas E. Tyson

[57] ABSTRACT

A data processing system including an instruction storage buffer for storing a sequence of instructions requiring an operation by at least two processors. The two processors are provided that execute instructions from the instruction storage buffer. An instruction dispatch circuit is provided that dispatches the instructions to the processors. At least one processor includes the capability to execute dispatched instructions before the execution of a preceding instruction in the instruction sequence by another processor. Also, at least one processor includes the capability to delay execution of an interruptable instruction until the instruction can be executed in its appropriate sequential order in the sequence. Also, upon the occurrence of the interrupt, the processors include the capability to purge the instruction storage buffer in order that the interrupt software instructions may be stored for execution.

6 Claims, 6 Drawing Sheets

TIGHTLY COUPLED MULTIPROCESSOR INSTRUCTION SYNCHRONIZATION

DESCRIPTION

1. Related Cases

This patent application is related to U.S. patent application Ser. No. 07/297,782, filed Jan. 13, 1989, entitled "Multiprocessing System for Performing Floating Point Arithmetic Operations", U.S. patent application Ser. No. 07/297,781, filed Jan. 13, 1989, entitled "Floating Point Arithmetic Two Cycle Data Flow", and U.S. patent application Ser. No. 07/297,771, filed Jan. 13, 1989 entitled "A Method and Apparatus for Performing Floating Point Division".

2. Field of the Invention

This invention relates to a data processing system and more specifically to a data processing including a plurality of individual processing units.

BACKGROUND ART

Traditionally data processing system execute a sequence of instruction one at a time. In a data processing system including multiple processing units, usually the decoding of the instructions is centralized to insure that each instruction is decoded according to its position in the sequence.

IBM Technical Disclosure Bulletin, Volume 25, Number 3B, August, 1982, pages 1637-1638, entitled "Multiprocessor Synchronization Design Method" discloses a process whereby collection of processors can determine simultaneously whether any of them is an a specified state. At the end of the process all processors will have agreed upon there current mutual status.

IBM Technical Disclosure Bulletin, Volume 30, Number 7, December, 1987, pages 98-99, entitled "Synchronization Processing Elements for Highly Parallel Multiprocessors Systems" disclose a technique whereby multiprocessing computer architecture enhanced through the use of a synchronization processing element to minimize the synchronization overhead in a highly parallel multiprocessor computer system.

IBM Technical Disclosure Bulletin, Volume 29, Number 10, March, 1987, entitled "Run-Time Algorithm for Distributed Processing Synchronization and Address Calculations", page 4658-4687 discloses run time algorithms which a resident in each distributed processing element of a distributed processing architecture. These run time algorithms implement scheduling an address calculation for each of the distributing processing elements in a coordinated matter with the other distributed processing elements in a network.

It is the object of the present invention to provide a multiprocessing system to execute a sequence of instructions in a manner that appears that the instructions are executed in sequence even though the actual execution of individual instruction by individual processors maybe out of sequence.

SUMMARY OF THE INVENTION

In accordance with the present invention a data processing system is provided that includes an instruction storage circuit for storing a sequence of instructions requiring the operation of two processors. At least two processors are included, each for executing instructions from said instruction storage circuit. An instruction dispatch circuit is provided for dispatching each instruction to at least one of the processors. At least one of the processors includes a circuit for executing dispatched instructions before execution of a preceding instruction in the instruction sequence by another processor.

In the preferred embodiment a data processing system is provided that includes a single instruction buffer that stores a sequence of instructions. At least one of the instructions in this sequence will require the operation of at least two separate processors. The instruction storage circuit is connected to the two processors. Each processor executes instructions from the instruction storage circuit. Also included in the invention is an instruction dispatch circuit that dispatches each instruction to at least one of the processors. At least one processor includes the capability to execute dispatched instructions before the execution of a preceding instruction in the instruction sequence by another processor.

In this preferred embodiment one processor is fixed point arithmetic processor. The second processor is a floating point arithmetic processor. The instruction sequence includes instructions for both the fixed point processor by itself and for the floating point processor by itself. However, the instruction sequence also includes floating point load and store instructions that, in this preferred embodiment, require the operation of both the fixed point processor and the floating point processor. Specifically, the fixed point processor performs address calculations to perform the load and store operations for the floating point instructions.

In this embodiment, a processor having the capability to execute dispatched instructions before the execution of preceding instructions by another processor also includes the capability to delay the execution of its instruction that is ahead of sequence when the instruction requires an operation to be performed by another processor. In this example, the floating point processor will not perform the floating point instruction if the floating point instruction requires the operation of the fixed point processor.

Also, in the present embodiment, the capability of a processor for executing a dispatched instruction before the execution of a preceding instruction by another processor further includes the capability to delay the execution of an interruptable instruction of a type capable of generating an interrupt condition for the processor until the interruptable instruction is executed in its appropriate sequential order with the execution of the other instructions.

BRIEF DESCRIPTION OF THE DRAWING

The novel features believed characteristic of the invention are set forth in the appended claims. The invention itself, however, as well as other features and advantages thereof, will be best understood by reference to the following description of the preferred embodiment, when read in conjunction with the accompanying figures, wherein:

BEST MODE FOR CARRYING OUT THE INVENTION

The present invention addresses the problem of multi-processor synchronization. Specifically, in the preferred embodiment illustrated, synchronization is required between a fixed point processor and a floating point processor. This requirement results from the fixed point processor having to perform address calculations for execution of the floating point load and store operations in the floating point processor. Another feature requiring synchronization results from the capability of the floating point processor to execute interruptable instructions ahead of the fixed point processor. Synchronization in this example prevents the floating point processor from executing interruptable instructions ahead of the fixed point processor.

Figure 1:
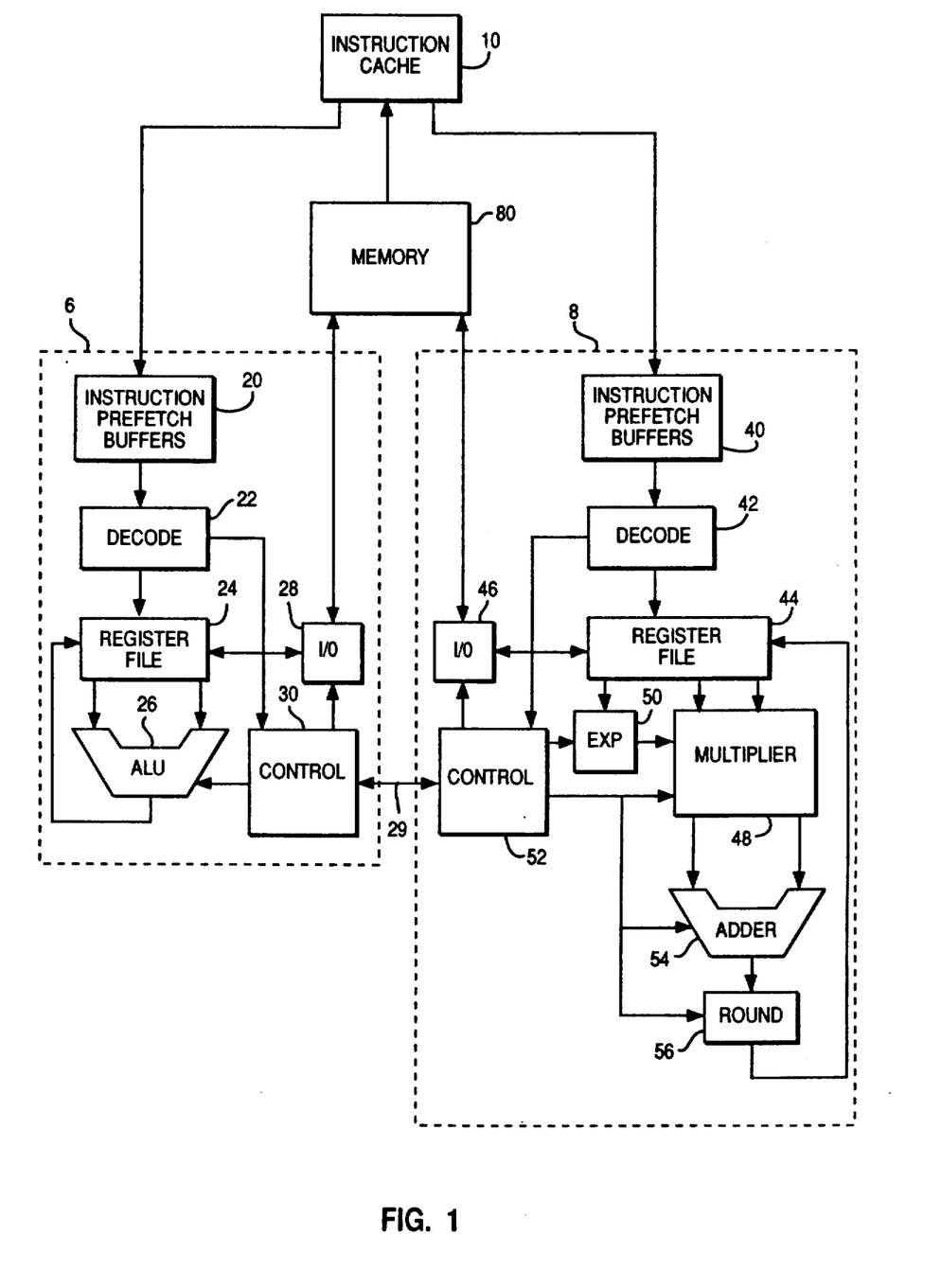
FIG. 1 is a block diagram of two processing units connected to a common instruction cache and common memory.

FIG. 1 illustrates a fixed point processor 6 connected to a floating point processor 8 via a control line 29 which represents multiple control signals. The fixed point processor 6 and floating point processor 8 are further connected to a common instruction cache 10 and a single memory 80. The fixed point processor 6 includes an instruction prefetch buffer 20 that is connected to the instruction cache 10. The instruction prefetch buffer 20 receives an instruction sequence from the instruction cache 10. That is the instructions from the instruction prefetch buffer 20 are decoded in decode circuitry 22 to provide information to the register file 24 and the control circuitry 30. In the preferred embodiment the register 24 of the fixed point processor 6 includes 32 individually addressable registers. The outputs of the register file 24 are provided to a arithmetic logic unit 26 (ALU). The output of the ALU 26 is provided back to the register file 24. The fixed point processor 6 also includes input/output circuitry (I/O) 28 connected to the register file 24 and the control circuitry 30. The I/O circuit 28 is connected to the external memory 80. The control circuitry 30 of the fixed point processor 6 controls the internal operations of the fixed point processor 6, the access of external memory 80 by the I/O circuitry 28 and the synchronization with the floating point processor 8.

The floating point processor 8 includes an instruction prefetch buffer 40 that is connected to the instruction cache 10. A decode circuit 42 is provided to decode instructions received from the instruction prefetch buffer 40. The decode circuitry 42 provides inputs the floating point processor control circuit 52 and to the register file 44. The register file 44 provides outputs to an exponential adder circuit 50 and a multiplier circuit 48. The output of the multiplier 48 is provided to an adder 54 which provides an output in turn to a rounding circuit 56. The control logic 52 also provides control inputs to the exponential adder 50, the multiplier 48, the adder 54 and the rounding circuit 56. In the preferred embodiment, the exponential adder performs exponential operations for floating point calculations and further provides shift control for the multiplier 48. The multiplier 48 is a wallace tree multiplier using a carry save adder architecture. Exponent add circuit 50 is an adder circuit for adding or subtracting the exponent for the multiplication operations. This exponent information is used to align addition operands for addition in the result of the multiplication operator.

The rounding circuit 56 increments the result from the adder 54 to provide a rounded result to the register file 44. The floating point processor 8 also includes an input/output circuit (I/O) 46 connected to the external memory 80. The I/O circuit 46 is further connected to the control circuitry 52. As in the fixed point processor 6, the control circuitry 52 provides the internal control of the floating point operations performed in the floating point processor 8. Additionally, the floating point control 52 is connected by via line 29 to the fixed point processor control 50 to receive synchronization signals from the fixed point processor 6.

In the preferred embodiment memory 80 serves as a means for data communication between the fixed point processor 6 and the floating point processor 8, if required. Also, the instruction cache 10 stores the instruction sequence for both the fixed point processor 6 and floating point processor 8. In this embodiment, the instruction sequence is provided to both the instruction prefetch buffer 20 of the fixed point processor 6 and the instruction prefetch buffer 40 of the floating point processor 8. In other words, the same instructions are provided to both prefetch buffers 20 and 40.

In the preferred embodiment the fixed point processor 6 is a 32 bit wide processing unit. The floating point processor 8 is a 64 bit wide floating point unit.

Figure 2:
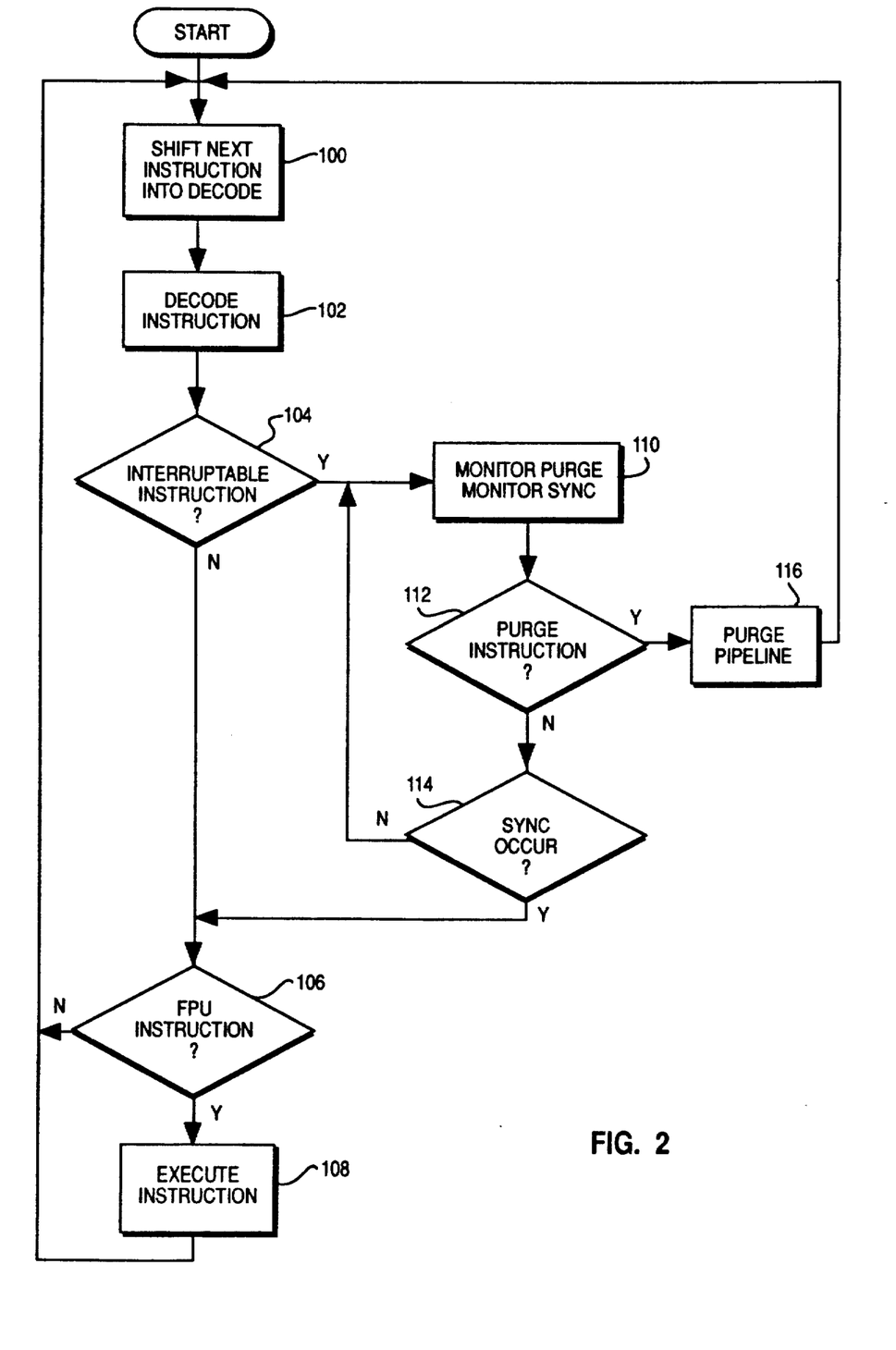
FIG. 2 is a flow chart illustrating a control function for the floating point processor.

FIG. 2 illustrates the control flow in the control unit 52 for the floating point processor. Specifically, this control flow illustrates the control of the synchronization function between the fixed point processor 6 and the floating point processor 8. Initially an instruction from the instruction prefetch buffer 40 is shifted into the decode circuitry 42 in step 100 of FIG. 2. In step 102 this instruction is decoded. In step 104, a decision is made as to whether or not the instruction that was decoded is an interruptable instruction. For the purposes of explanation here, only loads and stores for the floating point processor 8 are interruptable. If the instruction that has been decoded is not interruptable, in step 106 the decision is made as to whether or not the instruction is a floating point instruction. If not, the control function returns to step 100. This would occur if the instruction that is being decoded is in fact a fixed point arithmetic instruction. Returning to step 106, if the instruction that was encoded is a floating point instruction, the floating point instruction is executed in step 108. Again, the control function returns to step 100 at the completion of the instruction execution.

Returning to step 104, if the instruction that has been decoded is an interruptable instruction, the control circuit 52 proceeds to step 110 to monitor the purge and synchronization signals. The purge and synchronization signals are illustrated as line 29 in FIG. 1 connecting the fixed point processor 6 control circuit 30 to the floating point processor 8 control circuit 52. In step 112, a decision is made as to whether or not the purge signal has been in receipt, if so, all instructions in the instruction prefetch buffer 40 are erased in step 116 and the control flow returns to step 100. Returning to step 112, if the purge signal has not been received, a decision is made in step 114 as to whether the synchronization signal has occurred. If not, the control flow returns to step 110 to again monitor these two signals. If a synchronization signal was received, step 114 directs the control flow to step 106 to determine if the instruction to be executed is a floating point instruction. In this manner the floating point processor 8 receives synchronization signals from the fixed point processor 6. However, it should be understood that if an instruction is not interruptable, the floating point processor 8 requires no synchronization signals from the fixed point processor 6. Therefore, it is perfectly permissible in accordance with the present invention for the floating point processor 8 to execute instructions ahead of sequence from the instruction executed by the fixed point processor 6.

Figure 3:
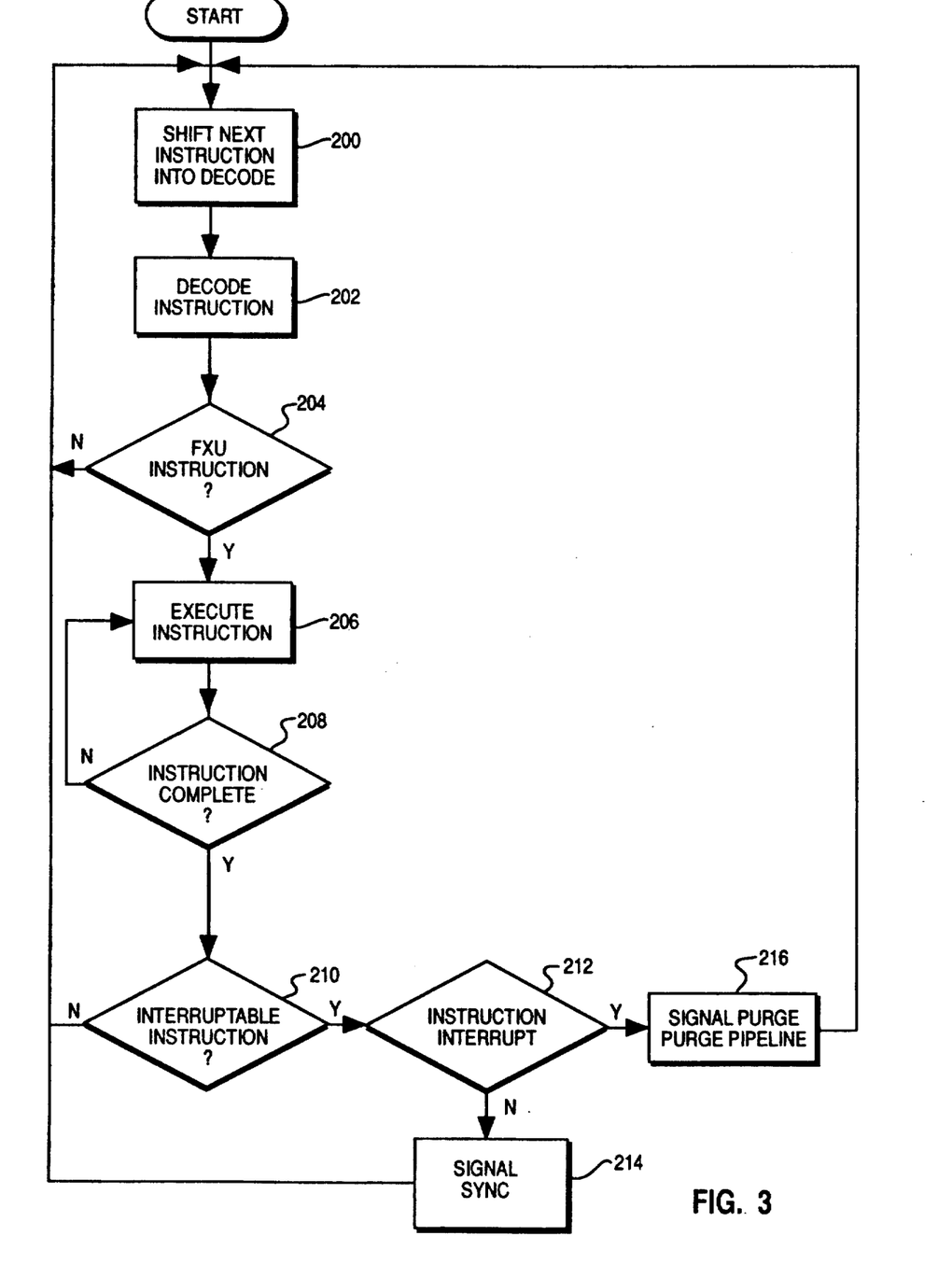
FIG. 3 is a flow chart illustrating the control function for the fixed point processor.

In FIG. 3, the control flow for the fixed point processor 6 is illustrated. In step 200 the next instruction from the instruction prefetch buffer 20 is shifted into the decode circuitry 22. This instruction is decoded in step 202. In step 204 a determination is made as to whether or not the instruction is a fixed point unit instruction or a floating point unit instruction. If the instruction is not a fixed point unit instruction, the control flow is directed to step 200. However, if the instruction is a fixed point unit instruction, the control flow proceeds to step 206. It should be understood that a floating point load and a floating point store are both considered by the fixed point processor 6 as fixed point instructions since they do require calculations of fixed point addresses by the fixed point processor 6. Therefore, any floating point instructions that do not require an operation to be performed within the fixed point processor 6 will return the control flow to step 200. On the other hand, any fixed point unit instruction requiring the operation of the fixed point processor 6 or a floating point load or store instruction will cause the control flow to proceed to step 206 to execute the instruction. In step 208, a decision is made whether or not the instruction execution has been complete, if not, the instruction execution continues in step 206. Upon instruction completion the control flow proceeds to step 210 to determine if the instruction is in fact interruptable. If the instruction is not interruptable, the control flow returns to step 200. However, if the instruction is interruptable, a decision is made in step 212 as to whether or not an instruction interrupt has in fact occurred. If the instruction interrupt has not occurred, the control flow proceeds to step 214 to provide the synchronization signal on line 29 (FIG. 1) to the control circuit 52 of the floating point processor 8. Afterwards, the control flow is returned to step 200.

If an instruction interrupt has occurred, the control flow proceeds to step 216 to (1) provide a purge signal on line 29 (FIG. 1) to the control circuit 52 of the floating point processor 8 and (2) provide a purging of the instruction prefetch buffer 20. Upon completion of step 216, the control flow returns to step 200.

It should be understood that the reason an interrupt will result in the purging of the instruction prefetch buffers 20 and 40 is because the interrupt handling software will be executed, therefore the remaining instructions in the instruction prefetch buffers that existed before the occurrence of the interrupt will not be executed. By purging the instruction prefetch buffers 20 and 40, the instruction cache 10 then is free to load the appropriate instructions for execution after the occurrence of the interrupt.

Figure 4:
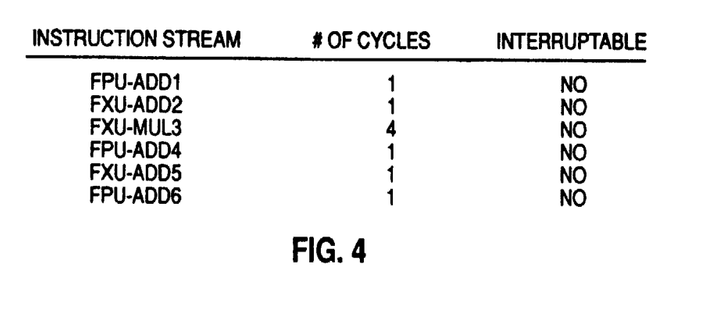
FIG. 4 is a list of floating point and fixed point instructions that do not generate interrupts.
Figure 5:
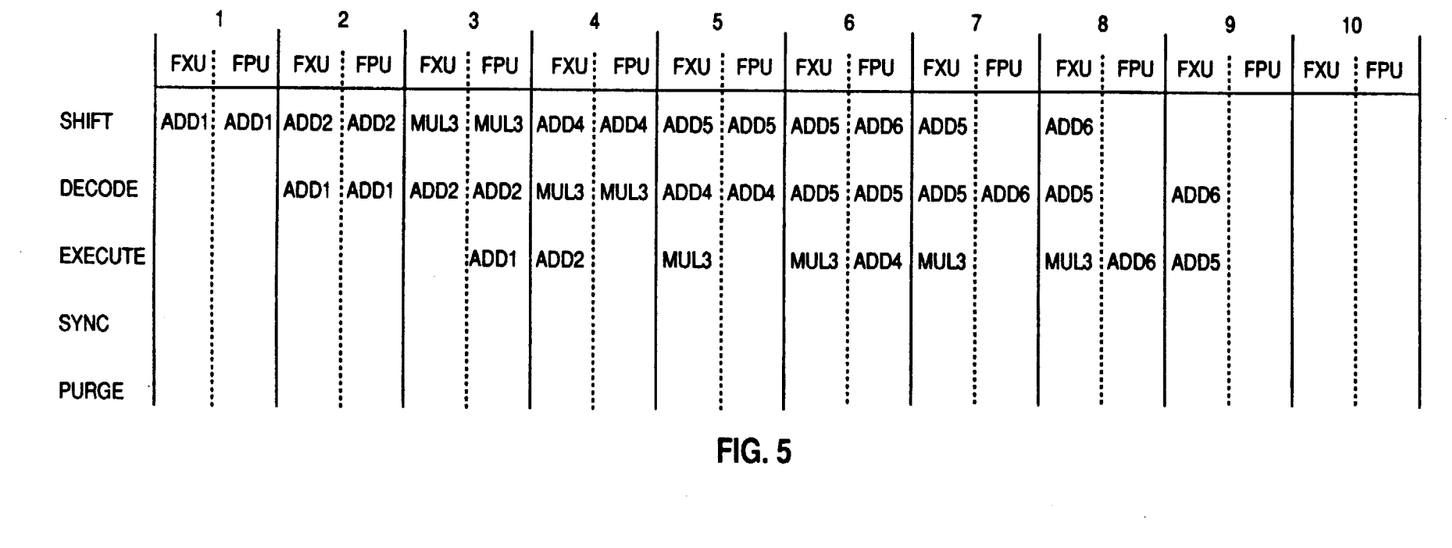
FIG. 5 is a timing diagram for the execution of the instruction sequence of FIG. 4.

Another point to note in FIG. 3 is that either a purge signal will produced in step 216 or synchronization signal will be produced in step 214 if the instruction is interruptable. Recalling FIG. 2, if an instruction is not interruptable, the floating point unit will not wait to receive any synchronization signals from the fixed point processor 6. In FIGS. 4 and 5, the operation of the two processors 6 and 8 is illustrated. In FIG. 4 a list of instructions is illustrated together with the number of cycles required for the execution of each instruction listed and whether or not the instructions are interruptable. In the example listed in FIG. 4, none of the instructions are interruptable. However, one of the instructions (FXU-MUL3) takes four cycles to execute. FPU represents a floating point unit instruction. FXU represents a fixed point unit instruction. Therefore the floating point unit instructions will be executed in the floating point processor 8 and the fixed point unit instructions will be executed in the fixed point processor 6.

FIG. 5 is a timing diagram illustrating the pipelined operation of both the fixed point unit processor 6 (FXU) and the floating point processor 8 (FPU) for several cycles (1 through 10). The pipeline operations include shift, decode and execute. The synchronization and purge lines illustrate the occurrence of either the synchronization or purge signals.

Referring to FIG. 5, in cycle 1, the ADD1 instruction is received by both the fixed point unit and the floating point unit instruction prefetch buffers 20 and 40 respectively. In cycle 2 the ADD1 is decoded by both as illustrated. Also, in cycle 2 the ADD2 instruction is shifted into the prefetch buffers 20 and 40 for both processors 6 and 8. In cycle 3, the multiple (MUL3) instruction is shifted into the buffers 20 and 40. The ADD2 instruction is decoded by both processors 6 and 8. However, the ADD1 instruction is only executed by the floating point processor 8, since it is a floating point instruction. In cycle 4, the ADD4 instruction is shifted, the MUL3 instruction is decoded, and the ADD2 instruction is executed by the fixed point processor 6 since it is a fixed point instruction. In cycle 5 the ADD5 instruction is shifted into the buffers 20 and 40. The ADD4 instruction is decoded by both processors 6 and 8 and the MUL3 instruction is executed in the fixed point processor 6. In cycle 6 the ADD5 instruction remains in the buffer 20 while the ADD6 instruction is loaded into the floating point processor 8 buffer 40. The ADD5 instruction in the fixed point processor 6 is also decoded as it is in the floating point processor 8. The multiple instruction (MUL3) continues to be executed in the fixed point processor 6. Note that the ADD4 instruction is being executed by the floating point processor 8 even though the floating point instruction ADD4 is ahead of sequence. In cycle 7 the MUL3 instruction execution continues while the ADD6 instruction is being decoded in the floating point processor 8. In cycle 8, the MUL3 instruction execution continues in the fixed point processor 6 and the ADD6 instruction is executed in the floating point processor 8. In cycle 9, the ADD6 instruction is being decoded in the fixed point unit of fixed point processor 6 even though it has already been executed by the floating point processor. Also the ADD5 instruction is being executed in the fixed point processor 6. In cycle 10 since the ADD6 instruction is a floating point instruction, which was actually executed before the ADD5 instruction (i.e., ahead of sequence), neither processor will have any pipeline operation to perform.

Figure 6:
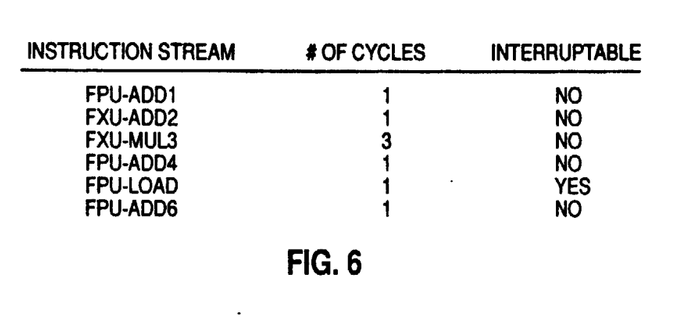
FIG. 6 is a instruction sequence list that includes a single interruptable instruction.
Figure 7:
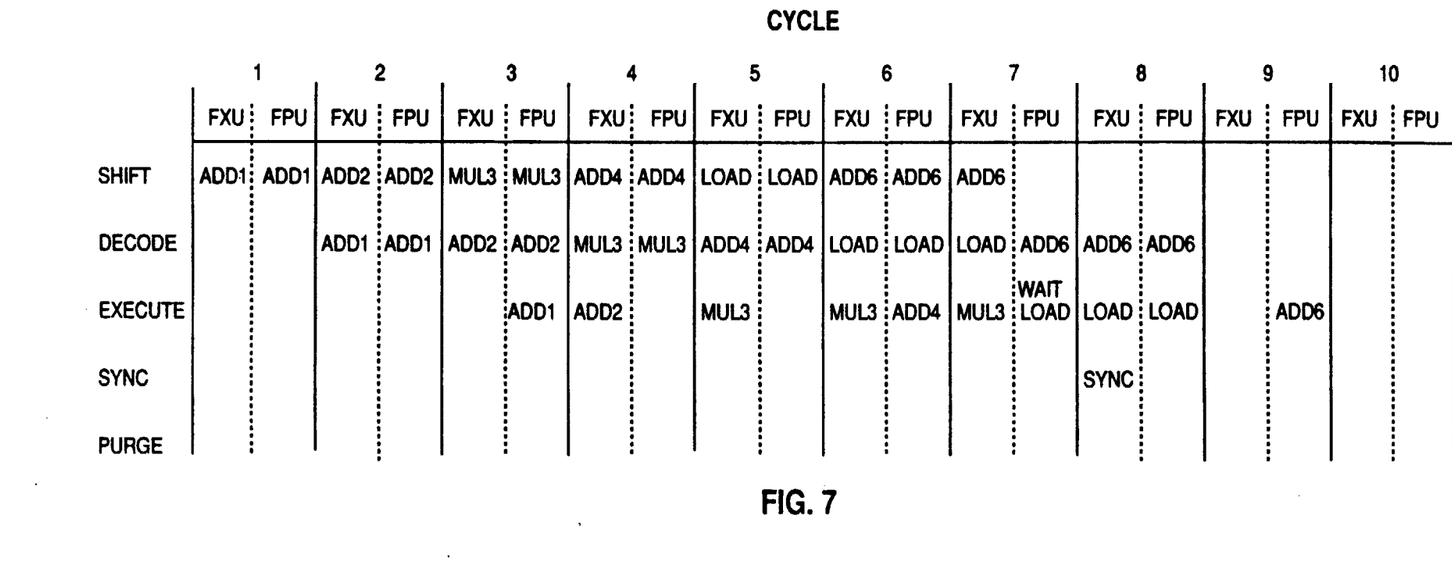
FIG. 7 is a timing diagram illustrating the execution of the instruction sequence in FIG. 6.

FIGS. 6 and 7 again illustrate an example instruction flow for the fixed point processor 6 and the floating point processor 8. However, in this example, a floating point load instruction is to be executed. FIG. 7 illustrates the performance of the pipelined operations in a manner similar to FIG. 5. Therefore, the explanation for the performance of the pipeline operations before the operations required for the floating point load will be explained since they are the same. In cycle 5, the floating point load instruction is loaded into both the buffers 20 and 40. In cycle 6 this instruction is decoded. However, note that the fixed point processor 6 is executing a multiple MUL3 that requires three cycles. Therefore, in cycle 7, the load instruction is still waiting to be executed in the fixed point processor 6 even though the load has been decoded in the floating point processor 8, the load instruction is not executed since it must wait for the execution of the address computation operation in the fixed point processor 6. However, the ADD6 instruction which comes after the load instruction is decoded. In cycle 8 a synchronization signal is provided by the fixed point processor 6 once the load operation has been executed in the fixed point processor 6. Upon the occurrence of the synchronization signal the floating point processor 8 executes its operations for the load instruction. Lastly, the execution of the ADD6 instruction is performed.

Figure 8:
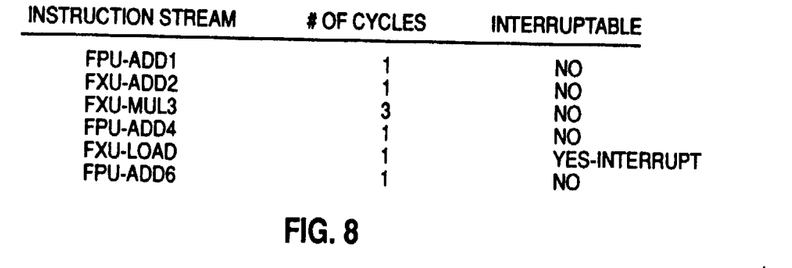
FIG. 8 is an instruction sequence including an interruptable instruction where an interrupt does in fact occur.
Figure 9:
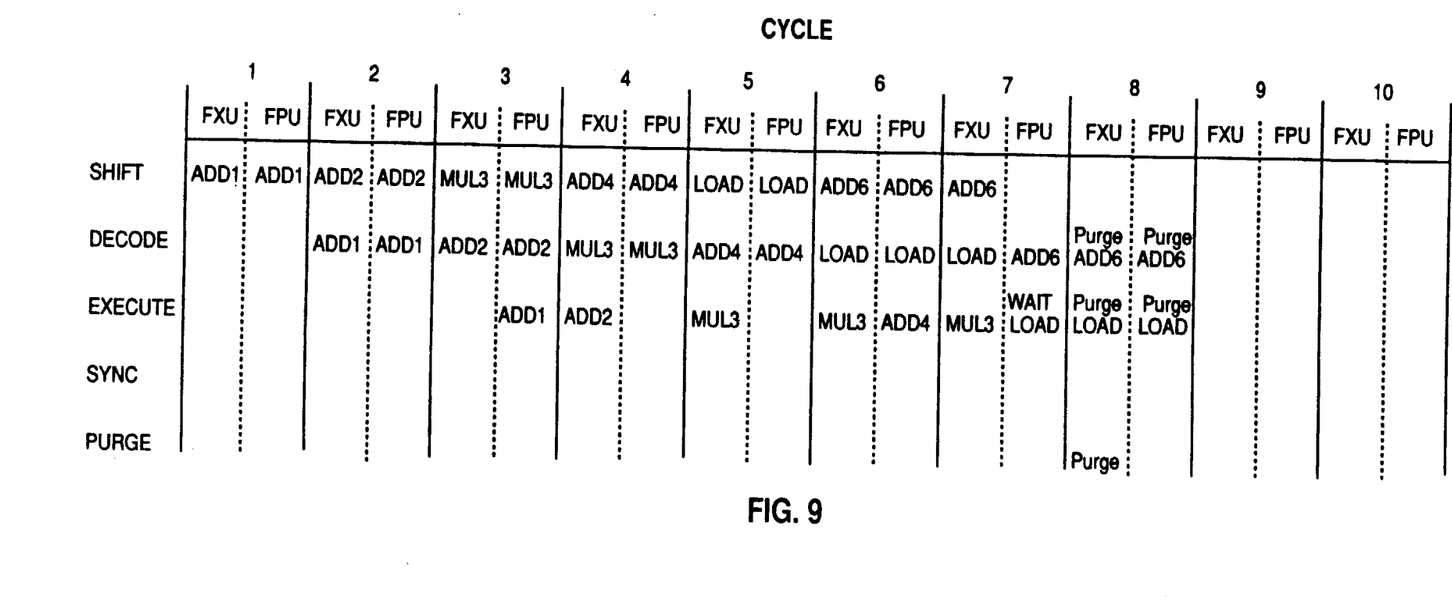
FIG. 9 is a timing diagram illustrating the execution of the instruction sequence in FIG. 8.

FIGS. 8 and 9 also provide another illustration of an instruction sequence. This instruction sequence is similar to that of FIG. 6, however, the floating point load instruction which is merely interruptable in FIG. 6 is now a fixed point load that generates an interrupt in FIG. 8. Again the timing diagram for the instruction list in FIG. 8 is illustrated in FIG. 9. The difference between FIG. 9 and FIG. 7 is in cycle 8. Note that a purge signal is provided from the fixed point processor 6 since the instruction (the fixed point load) has caused an interrupt to occur. Upon receiving the purge signal, the floating point processor 8 will purge the contents of the instruction prefetch buffer 40. Also, upon generating the purge signal, the floating point processor 6 will purge the contents of its instruction prefetch buffer 20.

The interrupts for the load and store instructions would occur if a page fault (i.e., not in memory) occurs in the preferred embodiment. In other words, a data cache is provided and if a instruction that is to be loaded is not contained in the data cache or in memory, an operation must be performed to fetch this data from an external memory. The fetching of the operation from external memory will take many cycles and the instruction sequence for providing this fetch is contained in the interrupt handler. Therefore, the instruction cache 10, upon the occurrence of the interrupt will contain the interrupt handler operations to perform this fetch.

Although the invention has been described with reference to this specific embodiment, this description is not meant to be construed in a limiting sense. Various modification of the disclosed embodiment, as well as other embodiments of the invention, will become apparent to those persons skilled in the art upon reference to the description of this invention. It is, therefore, contemplated that the appended claims will cover any such modifications or embodiments as fall within the true scope of the invention.

We claim:
1. A data processing system comprising:
   an instruction storage means for storing a sequence of instructions requiring operation by at least two processor means;
   a plurality of processor means for executing instructions from said instruction storage means;
   instruction dispatch means, connected to said instruction storage means and said plurality of processors, for dispatching each instruction to at least one of said processor means; and
   at least one of said processor means including means, connected to said instruction dispatch means, for executing dispatched instructions before the execution of a preceding instruction in the instruction sequence by another processor means, and said executing means including means for delaying execution of an interruptible instruction for said processor means until said interruptible instruction is executed in its sequential order with the execution of other instructions in the sequence by other processor means.

2. A data processing system according to claim 1 wherein said means for executing dispatched instructions before the execution of said preceding instruction further includes means for delaying execution of an instruction ahead of sequence when said instruction requires operations by another processor means.

3. A data processing system according to claim 2 wherein said instruction dispatch means includes means for detecting the occurrence of an interrupt and in response thereto, for dispatching instructions of the sequence in the order previously dispatched before the occurrence of the interrupt.

4. A data processing system according to claim 3 wherein said means for executing dispatched instructions before the execution of said preceding instruction further includes means for delaying execution of an instruction ahead of sequence when said instruction requires operation by another processor means.

5. A data processing systems according to claim 4 wherein said instruction storage means includes the sequence of instruction for the at least two processor means and the instruction dispatch means dispatches each instruction to the at least two processor means.

6. A data processing system according to claim 5 wherein said instruction sequence includes at least one instruction that requires the operations of two processors.

* * * * *